United States Patent
Barnes (10) Patent No.: US 10,056,059 B2
(45) Date of Patent: Aug. 21, 2018

(54) RESOLUTION-INDEPENDENT VIRTUAL DISPLAY

(75) Inventor: Andrew R. Barnes, Foster City, CA (US)

(73) Assignee: Apple Inc., Cupertino, CA (US)

( * ) Notice: Subject to any disclaimer, the term of this patent is extended or adjusted under 35 U.S.C. 154(b) by 862 days.

(21) Appl. No.: 12/959,072

(22) Filed: Dec. 2, 2010

(65) Prior Publication Data

US 2012/0092305 A1    Apr. 19, 2012

Related U.S. Application Data

(60) Provisional application No. 61/394,681, filed on Oct. 19, 2010.

(51) Int. Cl.

| G09G 5/391 | (2006.01) |
|---|---|
| G09G 5/00 | (2006.01) |
| G06F 3/14 | (2006.01) |
| G09G 5/14 | (2006.01) |
| G09G 5/397 | (2006.01) |

(52) U.S. Cl.
CPC ........... *G09G 5/391* (2013.01); *G06F 3/1423* (2013.01); *G09G 5/14* (2013.01); *G09G 5/397* (2013.01); *G09G 2340/0407* (2013.01)

(58) Field of Classification Search
None
See application file for complete search history.

(56) References Cited

U.S. PATENT DOCUMENTS

| 6,618,026 | B1 | 9/2003 | Grigor |
| 7,475,356 | B2 | 1/2009 | Baudisch |
| 7,629,945 | B2 * | 12/2009 | Baudisch ........................ 345/1.3 |
| 2003/0048275 | A1 * | 3/2003 | Ciolac ........................... 345/544 |
| 2005/0213833 | A1 | 9/2005 | Okada |
| 2007/0288855 | A1 * | 12/2007 | Rohrabaugh et al. ......... 715/760 |
| 2008/0030425 | A1 * | 2/2008 | Fullerton et al. .............. 345/1.1 |
| 2008/0036693 | A1 * | 2/2008 | Driver et al. ................... 345/1.3 |
| 2009/0309808 | A1 | 12/2009 | Swingler |

OTHER PUBLICATIONS

Sakurai, Satoshi et al., "A Middleware for Seamless Use of a Multiple Displays", pp. 252-266, 2008.

* cited by examiner

*Primary Examiner* — Tize Ma
(74) *Attorney, Agent, or Firm* — Blank Rome LLP (57) ABSTRACT

The disclosed embodiments provide a system that drives a first display and a second display with a higher pixel density than the first display from a computer system. During operation, the system provides a set of backing stores for windows in the computer system. Next, the system enables a first set of clients to draw to the backing stores using a virtual coordinate system. Finally, the system uses the backing stores to drive the first and second displays so that a given distance in the virtual coordinate system is substantially the same size on the first and second displays.

17 Claims, 4 Drawing Sheets

RESOLUTION-INDEPENDENT VIRTUAL DISPLAY

RELATED APPLICATION

This application hereby claims priority under 35 U.S.C. § 119 to U.S. Provisional Application No. 61/394,681, entitled "Resolution-Independent Virtual Display," by inventor Andrew R. Barnes, filed 19 Oct. 2010.

BACKGROUND

Field

The disclosed embodiments relate to techniques for driving displays from a computer system. More specifically, the disclosed embodiments relate to techniques for driving displays with different pixel densities by using a resolution-independent virtual display.

Related Art

Interactions between a user and a computer system may be facilitated by connecting multiple displays to the computer system. For example, the connection of an external monitor to a laptop computer may allow the user of the laptop computer to simultaneously view more documents, media files (e.g., video, images, etc.), and/or graphical user interfaces (GUIs) for applications than would be possible with just the laptop computer's built-in monitor. Furthermore, the laptop computer may include a standardized video interface such as Digital Visual Interface (DVI) or High-Definition Multimedia Interface (HDMI) that allows the laptop computer to be connected to displays with different resolutions, pixel densities, color profiles, and/or color depths.

However, graphical output may appear differently on displays with different pixel densities, color profiles, and/or color depths. For example, mirroring of displays with different color spaces may produce noticeable differences in the displays' color outputs, as well as the inaccurate generation of colors in at least some of the displays. Similarly, graphical output on a display with a high pixel density may appear smaller than on a display with a normal pixel density, causing potential problems with viewing of the graphical output and/or the usability of applications associated with the graphical output.

Hence, what is needed is a mechanism for facilitating the production of device-independent graphical output for different displays.

SUMMARY

The disclosed embodiments provide a system that drives a first display and a second display with a higher pixel density than the first display from a computer system. During operation, the system provides a set of backing stores for windows in the computer system. Next, the system enables a first set of clients to draw to the backing stores using a virtual coordinate system. Finally, the system uses the backing stores to drive the first and second displays so that a given distance in the virtual coordinate system is substantially the same size on the first and second displays.

In some embodiments, the system also enables a second set of clients to draw to the backing stores using a pixel coordinate system containing pixels associated with at least one of the first display and the second display.

In some embodiments, the higher pixel density of the second display is managed by the second set of clients.

In some embodiments, the system also enables, for the first set of clients, receipt of events using the virtual coordinate system by transforming pixel coordinates from the events into virtual points in the virtual coordinate system.

In some embodiments, each of the first set of clients draws to the backing stores using at least one of a raster-graphics context and a vector-graphics context.

In some embodiments, a backing store has the same dimensions as a window corresponding to the backing store in the first display, and the raster-graphics context draws to the backing store by executing draw commands from one or more of the first set of clients.

In some embodiments, a backing store has the same dimensions as a window corresponding to the backing store in the second display, and the vector-graphics context draws to the backing store by applying linear transformations to draw commands from one or more of the first set of clients.

In some embodiments, using the backing stores to drive the first and second displays so that a given distance in the virtual coordinate system is substantially the same size on the first and second displays involves:
 (i) downsampling data from a backing store prior to driving the first display using the data; or
 (ii) upsampling data from the backing store prior to driving the second display using the data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for driving multiple displays from a computer system. The computer system may correspond to a laptop computer, personal computer, workstation, and/or portable electronic device. Each display may be a cathode ray tube (CRT) display, liquid crystal display (LCD), plasma display, organic light-emitting diode (OLED) display, surface-conducting electron-emitter display (SED), and/or other type of electronic display. The displays may be connected concurrently and/or sequentially to the computer system. For example, a personal computer may be connected to two external displays at the same time, or the personal computer may be connected to a first display at a first location (e.g., home), then to a second display at a second location (e.g., office).

More specifically, the disclosed embodiments provide a resolution-independent virtual display for driving physical displays connected to the computer system. Clients in the computer system may generate graphical output for windows in the virtual display by drawing to backing stores for the windows. In addition, the clients may draw to the backing stores using a virtual coordinate system containing virtual points instead of a pixel coordinate system containing pixels associated with one or more displays connected to the computer system.

The virtual display may then be created from the backing stores and scaled up and/or down to drive the display(s) such that a given distance in the virtual coordinate system is substantially the same size across the displays. For example, data in a backing store may be upsampled to drive a display with a pixel density that is higher than the pixel density for which the backing store is configured. Conversely, a backing store may be scaled down if the display's pixel density is lower than the pixel density for which the backing store is configured. In other words, the virtual display may generate graphical output that is resolution-independent across displays of different pixel densities.

Figure 1:
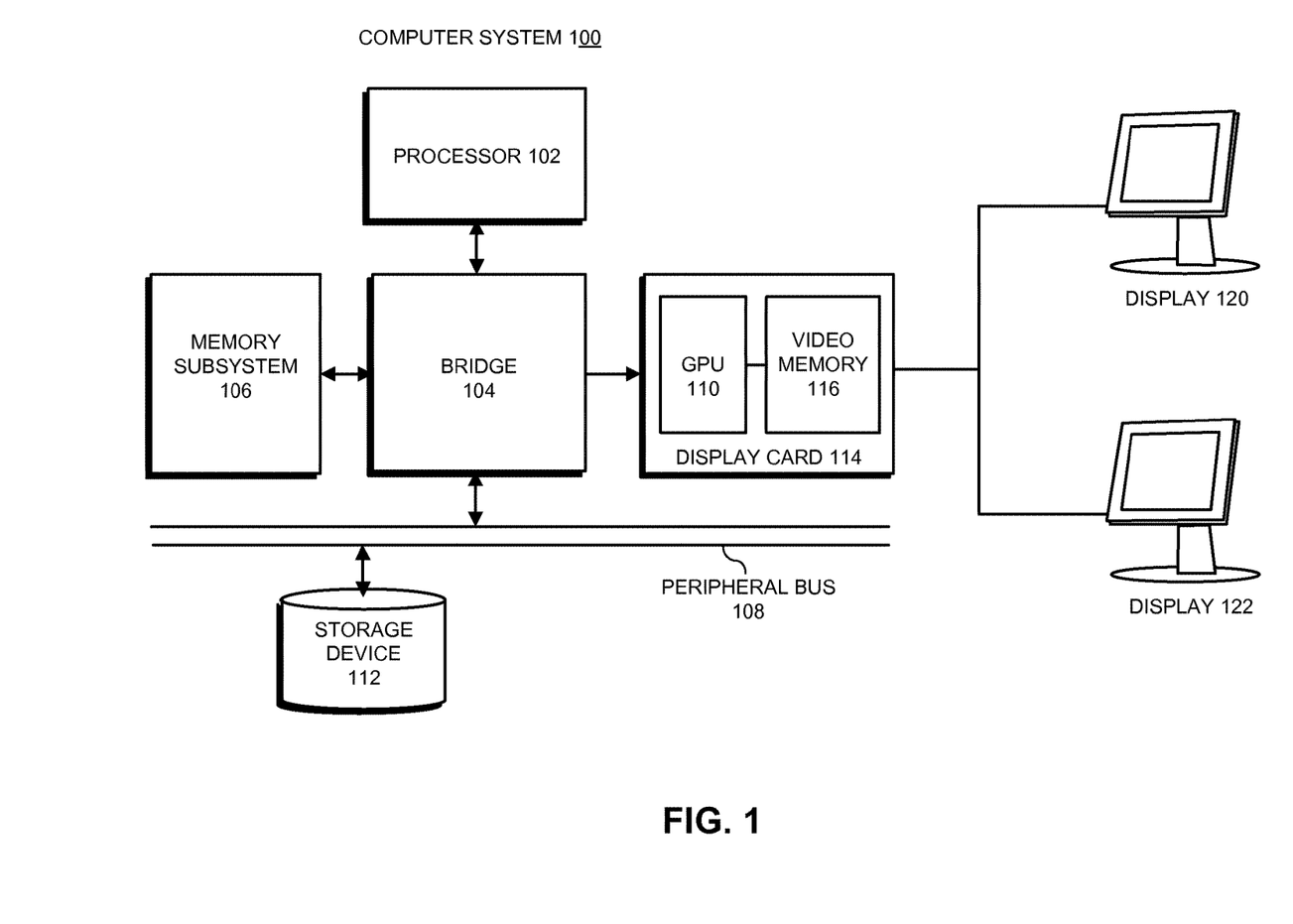
FIG. 1 shows a computer system in accordance with the disclosed embodiments.

FIG. 1 shows a computer system 100 in accordance with the disclosed embodiments. Computer system 100 may correspond to a personal computer, laptop computer, portable electronic device, workstation, and/or other electronic device capable of driving multiple displays 120-122. As shown in FIG. 1, computer system 100 includes a processor 102 that is coupled through a bridge chip 104 to a memory subsystem 106 containing semiconductor memory. Processor 102 may also communicate with a storage device 112 containing non-volatile storage through a peripheral bus 108 coupled to bridge chip 104. For example, storage device 112 may be a disk drive containing non-volatile magnetic storage.

In addition, processor 102 may communicate with a number of displays 120-122 using a display card 114. More specifically, processor 102 is coupled to display card 114 through bridge chip 104. Display card 114 includes a graphics-processing unit (GPU) 110 that performs various graphical processing operations to produce video frames in one or more framebuffers located in video memory 116. The video frames may then be used to produce video streams that drive displays 120-122.

Those skilled in the art will appreciate that displays 120-122 may incorporate various types of display technology to render and display images. For example, displays 120-122 may correspond to cathode ray tube (CRT) displays, liquid crystal displays (LCDs), plasma displays, organic light-emitting diode (OLED) displays, surface-conducting electron-emitter displays (SEDs), and/or other types of electronic displays. Furthermore, displays 120-122 may be associated with different manufacturers and/or brands. Such differences in display technology and/or manufacturing may cause displays 120-122 to have different pixel densities, which in turn may produce noticeable differences in graphical output between displays 120-122.

In particular, graphical output on a display with a higher pixel density may appear smaller than on a display with a lower pixel density. For example, text, images, icons, buttons, and/or other graphical objects may appear twice as large on a first display with a pixel density of 100 dots per inch (DPI) than on a second display with a pixel density of 200 DPI. Such size differences may additionally be perceptible to a user of computer system 100, regardless of whether the displays are connected sequentially or concurrently to computer system 100. For example, the user may notice a window shrinking as he/she drags the window from a 100-DPI display to a 200-DPI display. Alternatively, the user may encounter a physical resizing of the entire desktop of computer system 100 as the user unplugs a Digital Visual Interface (DVI) cable from a 100-DPI, 24-inch display and subsequently plugs the DVI cable into a 200-DPI, 24-inch display.

As a result, graphical output may be difficult to view if clients on computer system 100 are configured to generate graphical output for a display with a different pixel density than one or both displays 120-122. The reduced visibility may further interfere with the accessibility and/or usability of the clients and, in turn, negatively impact the overall user experience with computer system 100. For example, "uneven" graphical output may be produced if some windows are drawn by clients that adjust graphical output based on pixel density and other windows are drawn by clients that are unable to react to changes in pixel density. Conversely, manual adjustments to computer system 100 that reduce the display resolution of high-DPI displays may facilitate use of legacy clients that generate graphical output for displays with standard pixel densities (e.g., 96 DPI), but may prevent more advanced clients from fully utilizing the high-DPI displays.

In one or more embodiments, computer system 100 includes functionality to generate graphical output that is the same size across displays of different pixel densities without requiring manual input from the user. The graphical output may be generated by providing a set of backing stores for windows in computer system 100 and enabling clients to draw to the backing stores using a virtual coordinate system. The backing stores may then be used to drive displays with different pixel densities (e.g., displays 120-122) so that a given distance in the virtual coordinate system is substantially the same size on the displays. As discussed below, the virtual coordinate system may further maximize the use of pixels in each display by each client, regardless of the pixel density of the display and/or the graphics-rendering capabilities of the client.

Figure 2:
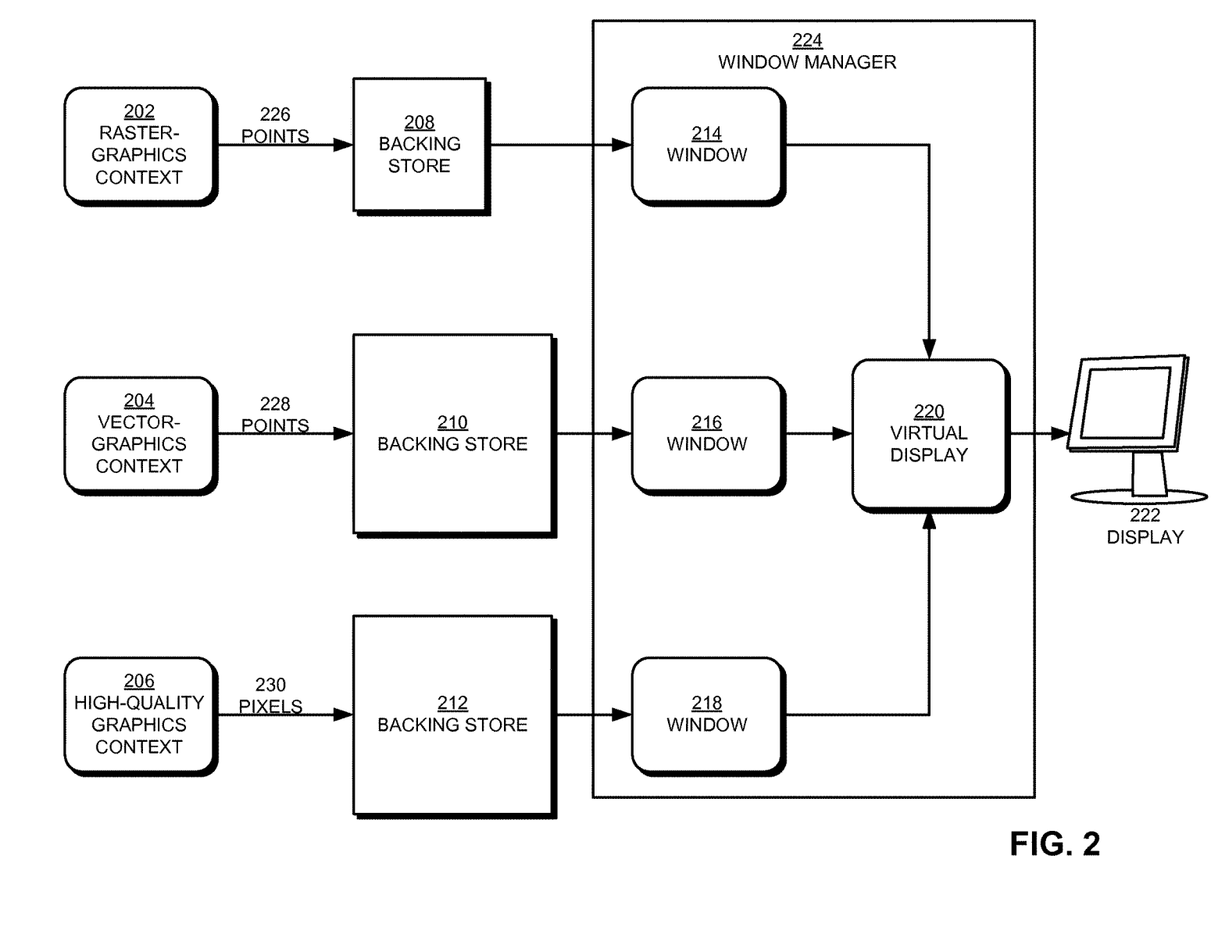
FIG. 2 shows a schematic of a system in accordance with the disclosed embodiments.

FIG. 2 shows a schematic of a system in accordance with the disclosed embodiments. More specifically, FIG. 2 shows a schematic of a system for driving a display 222 from a computer system, such as computer system 100 of FIG. 1. As shown in FIG. 2, display 222 is driven using a virtual display 220. In turn, the contents of virtual display 220 are created by a window manager 224 using a set of windows 214-218, a set of backing stores 208-212, and a set of drawing contexts that includes a raster-graphics context 202 a vector-graphics context 204 and a high-quality graphics context 206.

In one or more embodiments, clients in the computer system generate graphical output by sending draw commands to the respective drawing contexts (e.g., raster-graphics context 202, vector-graphics context 204, high-quality graphics context 206) for execution. Furthermore, each drawing context may be used by a different type of client in the computer system.

In particular, raster-graphics context 202 and vector-graphics context 204 may be associated with a first set of clients that draw to the corresponding backing stores 208-210 using a virtual coordinate system. The virtual coordinate system may contain virtual points representing abstractions of physical pixels in display 222 and/or other displays. Consequently, the virtual coordinate system may facilitate the generation of resolution-independent graphical output that is used to drive display 222 and/or other displays. For example, the virtual coordinate system may allow the graphical output to be resized prior to driving two displays with different pixel densities so that a given distance in the virtual coordinate system is substantially the same size on both displays.

First, raster-graphics context 202 may be used by a client that generates graphical output by modifying elements in a bitmap for the corresponding window 214. For example, raster-graphics context 202 may be associated with an older graphics library that is used by a legacy application to render graphics in the computer system. Consequently, backing store 208 may have the same dimensions as the dimensions requested by the client for window 214, and virtual points 226 in the virtual coordinate system may represent specific locations in backing store 208. In addition, raster-graphics context 202 may draw to backing store 208 by simply executing draw commands from the client.

For example, the client may request a 100×100 window 214 from window manager 224. Window manager 224 may create window 214 in virtual display 220 using the requested dimensions, while raster-graphics context 202 may create a 100×100 backing store 208 for window 214. After the client draws to backing store 208 via raster-graphics context 202 and generates a "flush" command to update display 222 with data in backing store 208, window manager 224 may composite the data with data for other windows in the computer system into a frame that is used to drive display 222.

However, the use of the virtual coordinate system in backing store 208 may allow data in backing store 208 to be upsampled and/or downsampled prior to driving display 222 with the data. More specifically, window manager 224 may scale the data based on the mapping of virtual points 226 in the virtual coordinate system and/or virtual display 220 to physical pixels on display 222. In other words, virtual display 220 may describe the dimensions of display 222 in terms of virtual points 226 instead of physical pixels, thus allowing the first set of clients to generate graphical output independently of the pixel density of display 222 and/or other displays connected to the computer system.

Continuing with the above example, the mapping may specify that an inch on display 222 is 100 virtual points 226 in length. As a result, window manager 224 may upsample the data from the 100×100 backing store 208 if display 222 has a pixel density of 200 DPI, downsample the data if display 222 has a pixel density of 50 DPI, and use the data without scaling if display 222 has a pixel density of 100 DPI.

On the other hand, vector-graphics context 204 may be used by a client that generates draw commands in terms of geometric primitives such as points, paths, polygons, and/or glyphs, thus allowing graphical output for window 216 to remain crisp and/or smooth regardless of the dimensions of backing store 210. For example, vector-graphics context 204 may render graphical output to backing store 210 by applying modeling, viewing, and/or projection transformations to shapes in a graphics model, and then performing a scan conversion on the transformed shapes.

Backing store 210 may thus be created with dimensions that enable full utilization of pixels in display 222 and/or other displays driven from the computer system. For example, as shown in FIG. 2, backing store 210 may be larger than backing store 208 for windows 214-216 of the same dimensions to allow vector-graphics context 204 to render high-quality graphics for a display (e.g., display 222) with a higher pixel density than the pixel density for which a client utilizing vector-graphics context 204 is configured. In turn, vector-graphics context 204 may draw to backing store 210 by applying linear transformations to draw commands from the client. For example, vector-graphics context 204 may scale graphical output to the dimensions of backing store 210 during scan conversion of shapes in a graphics model.

Consequently, backing stores 208-210 with dimensions that map differently to the dimensions of windows 214-216 may require data from at least one of the backing stores 208-210 to be scaled prior to driving display 222. Continuing with the above example, the increased size of backing store 210 relative to the requested dimensions of window 216 may allow the contents of backing store 210 to be used in driving a display with a high pixel density, while the data in backing store 208 may require upsampling to generate resolution-independent graphical output for the same display.

Conversely, data in backing store 208 may be used to drive a standard-DPI display, while data in backing store 210 may be downsampled prior to driving the display with the data to reduce the physical size of window 216 in the standard-DPI display. In other words, window manager 224 may use the pixel density of display 222, the presentation bounds of windows 214-216, and the backing bounds of backing stores 208-210 to scale data from backing stores 208-210 such that a given distance in the virtual coordinate is substantially the same size in displays (e.g., display 222) with different pixel densities.

Those skilled in the art will appreciate that events such as cursor events in the computer system may be generated using physical pixel locations in display 222. To allow the clients of raster-graphics context 202 and vector-graphics context 204 to receive and respond to such events, window manager 224 may transform pixel coordinates from the events into virtual points 226-228 associated with the clients. For example, window manager 224 may transform pixel coordinates from a high-DPI display into virtual points 226-228 used by clients of raster-graphics context 202 and/or vector-graphics context 204 by dividing the pixel coordinates by the scale factor between points 226-228 and the pixel coordinates.

Finally, high-quality graphics context 206 may be associated with a second set of clients that are capable of responding to changes in pixel densities of displays driven from the computer system. For example, high-quality graphics context 206 may be used by an application (e.g., a photo-editing application) that renders high-resolution graphical output using both vector-based primitives and raster-based bitmap elements. High-quality graphics context 206 may thus obtain backing store 212 with dimensions that correspond to the pixel dimensions of window 218 in the display (e.g., display 222) in which window 218 is shown.

In addition, draw commands executed by high-quality graphics context 206 may be specified in terms of pixels 230 instead of points 226-228. As a result, varying pixel densities across displays may be managed by the client associated with high-quality graphics context 206 instead of window manager 224. Along the same lines, events associated with the client may contain pixel coordinates instead of virtual points to allow the client to fine-tune responses to the events.

Such decoupling of the coordinate systems used to generate graphical output by the first set of clients from the physical pixels used to display the graphical output may allow the graphical output to be normalized across clients that utilize different drawing contexts and/or displays with different pixel densities. At the same time, the allocation and use of backing stores 208-212 based on the graphics-rendering capabilities of the corresponding clients may maximize the utilization of pixels in the displays by the clients. In other words, the system of FIG. 2 may increase both resolution independence and image quality in driving display 222 from the computer system.

Figure 3:
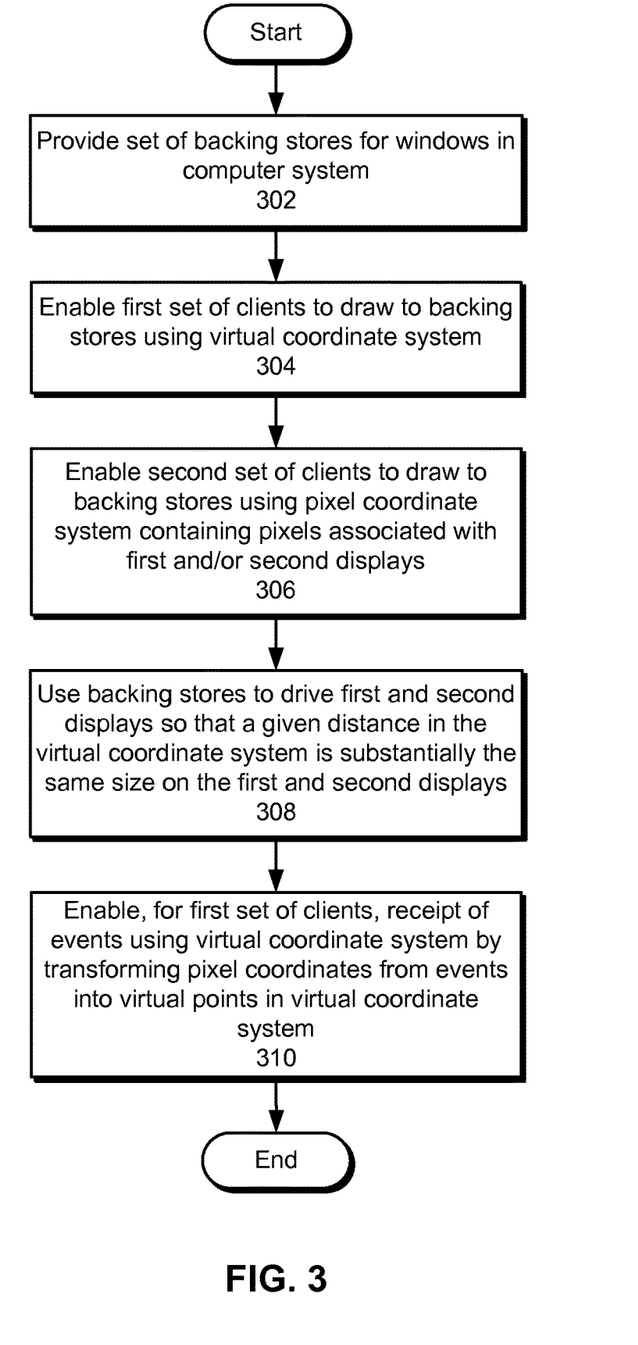
FIG. 3 shows a flowchart illustrating the process of driving a first display and a second display with a higher pixel density than the first display from a computer system in accordance with an embodiment.

FIG. 3 shows a flowchart illustrating the process of driving a first display and a second display with a higher pixel density than the first display from a computer system in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of backing stores is provided for windows in the computer system (operation 302). As discussed below with respect to FIG. 4, the dimensions of each backing store may be based on the pixel densities of the first and/or second displays and/or the dimensions of the window requested by the corresponding client. Next, drawing to the backing stores using a virtual coordinate system is enabled for a first set of clients (operation 304). The virtual coordinate system may contain virtual points that serve as abstractions of physical pixels on the first and second displays.

In addition, drawing to the backing stores using a pixel coordinate system containing pixels associated with the first and/or second displays may be enabled for a second set of clients (operation 306). As a result, the second set of clients may manage the higher pixel density of the second display.

The backing stores are then used to drive the first and second displays so that a given virtual point in the virtual coordinate system is substantially the same size on the first and second displays (operation 308). In particular, data from a backing store that is larger than the pixel dimensions of the corresponding window in the first display may be downsampled prior to driving the first display using the data. Conversely, data from a backing store that is smaller than the pixel dimensions of the corresponding window in the second display may be upsampled prior to driving the second display using the data.

Finally, receipt of events using the virtual coordinate system is enabled for the first set of clients by transforming pixel coordinates from the events into virtual points in the virtual coordinate system (operation 310). The use of the virtual coordinate system in generating graphical output and receiving location-specific user input may thus hide the respective pixel densities of the first and second displays from the first set of clients and facilitate the generation of graphical output that is uniform across different drawing contexts and/or displays with different pixel densities.

Figure 4:
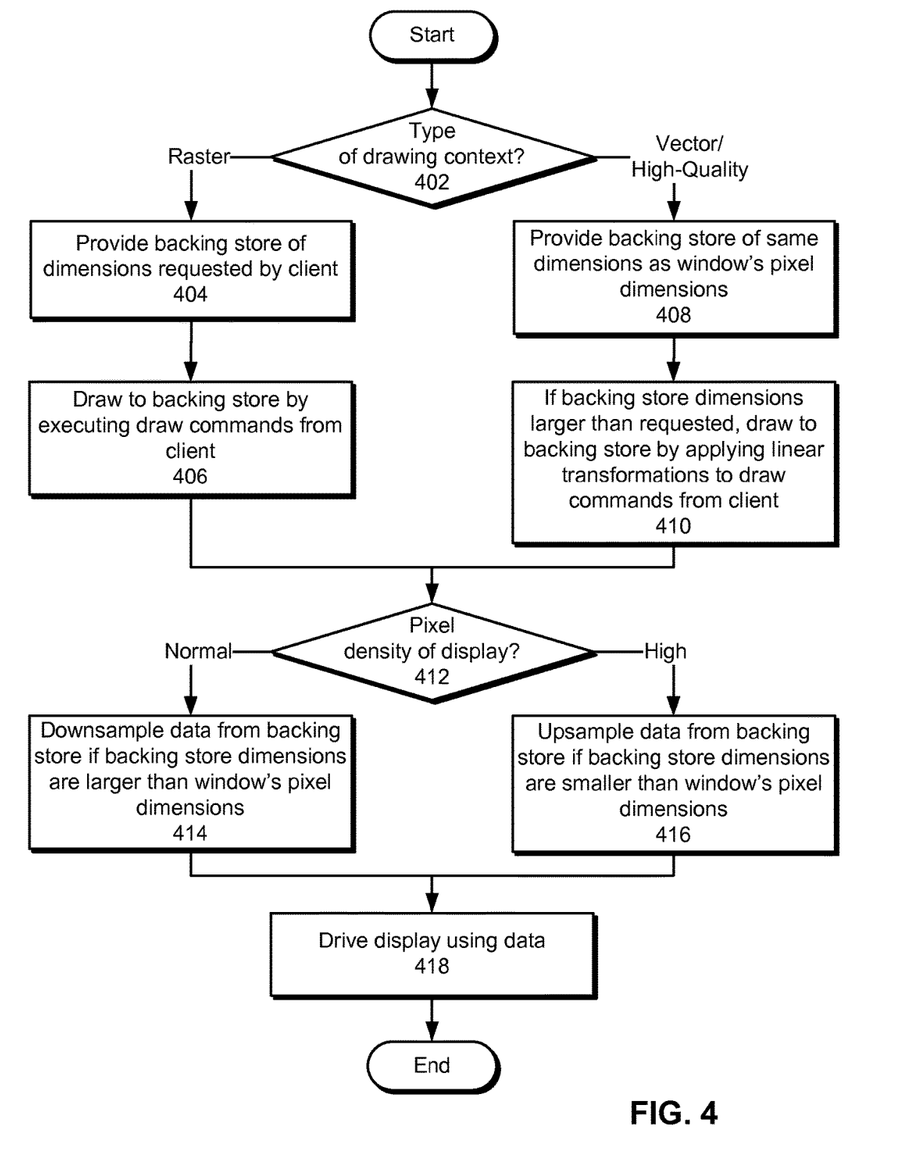
FIG. 4 shows a flowchart illustrating the process of generating data for driving a display in accordance with an embodiment.

FIG. 4 shows a flowchart illustrating the process of generating data for driving a display in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, the generation of data may depend on the type of drawing context used (operation 402) to render graphical output for a window in the display. If the drawing context corresponds to a raster-graphics context, a backing store of the dimensions requested by the client is provided (operation 404), and the backing store is drawn to by executing draw commands from the client (operation 406). In other words, virtual points in the virtual coordinate system used by the client may have a 1:1 mapping with bitmap locations in the backing store and/or pixel locations in a normal-DPI display.

On the other hand, if the drawing context corresponds to a vector-graphics context and/or a high-quality graphics context, a backing store of the same dimensions as the window's pixel dimensions in the display is provided (operation 408). For example, a backing store for a 100×100 window in a high-DPI display may include dimensions of 200×200 instead of 100×100. In addition, if the backing store dimensions are larger than those requested by the client (e.g., for the window), the backing store is drawn to by applying linear transformations to the client's draw commands (operation 410). The backing store for the vector-graphics context and/or high-quality graphics context may thus allow the client to render crisp images regardless of the pixel density of the display.

Next, the data may be downsampled and/or upsampled based on the pixel density of the display (operation 412). If the pixel density is normal (e.g., 96 DPI), data from the backing store is downsampled if the backing store dimensions are larger than the window's pixel dimensions (operation 414). If the pixel density is high (e.g., 192-200 DPI), data from the backing store is upsampled if the backing store dimensions are smaller than the window's pixel dimensions (operation 416). The data is then used to drive the display (operation 418). For example, a window manager may write the data to an update buffer containing a frame of data for the display. The window manager may then drive the display by writing the contents of the update buffer to a framebuffer for the display.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for generating graphical output that has a substantially similar size across multiple displays having different pixel densities, the method comprising:
enabling a first client to draw first pixel information to a first memory using a virtual coordinate system that is independent of a first pixel density of a first physical display and further independent of a second pixel density of a second physical display, the first pixel information being represented in the virtual coordinate system as a plurality of virtual points that serve as abstractions of physical pixels on the first and second physical displays, wherein the first and second pixel densities of the first and second physical displays are different from each other;
converting the plurality of virtual points into a first plurality of pixels dependent on, and scaled to, the first pixel density of the first physical display and into a second plurality of pixels dependent on, and scaled to, the second pixel density of the second physical display so that a distance between two given virtual points in the virtual coordinate system is substantially equal on both the first and second physical displays;
enabling a second client to draw second pixel information to a second memory using a pixel coordinate system that is dependent on at least one of the first pixel density of the first physical display and the second pixel density of the second physical display;
creating, based on one of the first and second plurality of pixels and based on the second pixel information, a virtual display representing the first and second pixel information drawn by the first and second clients; and
driving, using the virtual display, one of the first and second physical displays to simultaneously present the first and second pixel information drawn by the first and second clients.

2. The method of claim 1, further comprising enabling the first client to receive one or more events using the virtual coordinate system, wherein additional first pixel information is associated with the one or more events; and
wherein the plurality of virtual points represent the additional first pixel information.

3. The method of claim 1, wherein the first client draws to the first memory using one or more of a raster-graphics context and a vector-graphics context.

4. The method of claim 3, wherein the raster-graphics context draws to the first memory by executing one or more draw commands received from the first client.

5. The method of claim 3, wherein the vector-graphics context draws to the first memory by applying one or more linear transformations to one or more draw commands from the first client.

6. The method of claim 1, wherein converting the plurality of virtual points into the first plurality of pixels and the second plurality of pixels comprises:
generating at least some of the first plurality of pixels by down-sampling or up-sampling at least some of the first pixel information drawn to the first memory when the first pixel density of the first physical display has one or more predetermined relationships with one or more threshold pixel densities associated with the first memory; and
generating at least some of the second plurality of pixels by down-sampling or up-sampling at least some of the first pixel information drawn to the first memory when the second pixel density of the second physical display has one or more predetermined relationships with one or more threshold pixel densities associated with the first memory.

7. A computer system configured to generate graphical output that has a substantially similar size across multiple displays having different pixel densities, comprising:
a first physical display having a first pixel density;
a second physical display having a second pixel density;
a memory including program code; and
a processor communicatively coupled to the first and second physical displays and the memory, wherein execution of the program code by the processor causes the processor to:
enable a first client to draw first pixel information to a first memory using a virtual coordinate system that is independent of the first pixel density of the first physical display and independent of the second pixel density of the second physical display, the first pixel information being represented in the virtual coordinate system as a plurality of virtual points that serve as abstractions of physical pixels on the first and second physical displays, wherein the first and second pixel densities of the first and second physical displays are different from each other;
convert the plurality of virtual points into a first plurality of pixels dependent on, and scaled to, the first pixel density of the first physical display and into a second plurality of pixels dependent on, and scaled to, the second pixel density of the second physical display so that a distance between two given virtual points in the virtual coordinate system is substantially equal on both the first and second physical displays;
enable a second client to draw second pixel information to a second memory using a pixel coordinate system that is dependent on at least one of the first pixel density of the first physical display and the second pixel density of the second physical display;
create, based on one of the first and second plurality of pixels and based on the second pixel information, a virtual display representing the first and second pixel information drawn by the first and second clients; and
drive, using the virtual display, one of the first and second physical displays to simultaneously present the first and second pixel information drawn by the first and second clients.

8. The computer system of claim 7, wherein the program code further causes the processor to enable the first client to receive one or more events using the virtual coordinate system, wherein additional first pixel information is associated with the one or more events; and
wherein the plurality of virtual points represent the additional first pixel information.

9. The computer system of claim 7, wherein the first client draws to the first memory using one or more of a raster-graphics context and a vector-graphics context.

10. The computer system of claim 9, wherein the raster-graphics context draws to the first memory by executing one or more draw commands from the first client.

11. The computer system of claim 9, wherein the vector-graphics context draws to the first memory by applying one or more linear transformations to one or more draw commands from the first client.

12. The computer system of claim 7, wherein the program code for causing the processor to convert the plurality of virtual points into the first plurality of pixels and the second plurality of pixels comprises program code for causing the processor to:

generate at least some of the first plurality of pixels by down-sampling or up-sampling at least some of the first pixel information drawn to the first memory when the first pixel density of the first physical display has one or more predetermined relationships with one or more threshold pixel densities associated with the first memory; and generate at least some of the second plurality of pixels by down-sampling or up-sampling at least some of the first pixel information drawn to the first memory when the second pixel density of the second physical display has one or more predetermined relationships with one or more threshold pixel densities associated with the first memory.

13. A non-transitory computer-readable storage medium storing instructions for generating graphical output that has a substantially similar size across multiple displays of different pixel densities, which when executed by one or more processors, cause the one or more processors to:

enable a first client to draw first pixel information to a first memory using a virtual coordinate system that is independent of a first pixel density of a first physical display and further independent of a second pixel density of a second physical display, the first pixel information being represented in the virtual coordinate system as a plurality of virtual points that serve as abstractions of physical pixels on the first and second physical displays, wherein the first and second pixel densities of the first and second physical displays are different from each other;

convert the plurality of virtual points into a first plurality of pixels dependent on, and scaled to, the first pixel density of the first physical display and into a second plurality of pixels dependent on, and scaled to, the second pixel density of the second physical display so that a distance between two given virtual points in the virtual coordinate system is substantially equal on both the first and second physical displays;

enable a second client to draw second pixel information to a second memory using a pixel coordinate system that is dependent on at least one of the first pixel density of the first physical display and the second pixel density of the second physical display;

create, based on one of the first and second plurality of pixels and based on the second pixel information, a virtual display representing the first and second pixel information drawn by the first and second clients; and drive, using the virtual display, one of the first and second physical displays to simultaneously present the first and second pixel information drawn by the first and second clients.

14. The non-transitory computer-readable storage medium of claim 13, wherein the first client draws to the first memory using one or more of a raster-graphics context and a vector-graphics context.

15. The non-transitory computer-readable storage medium of claim 14, wherein the raster-graphics context draws to the first memory by executing one or more draw commands from the first client.

16. The non-transitory computer-readable storage medium of claim 14, wherein the vector-graphics context draws to the first memory by applying linear transformations to one or more draw commands from the first client.

17. The non-transitory computer-readable storage medium of claim 13, wherein the instructions for causing the one or more processors to convert the plurality of virtual points into the first plurality of pixels and the second plurality of pixels comprise instructions for causing the one or more processors to:

generate at least some of the first plurality of pixels by down-sampling or up-sampling at least some of the first pixel information drawn to the first memory when the first pixel density of the first physical display has one or more predetermined relationships with one or more threshold pixel densities associated with the first memory; and generate at least some of the second plurality of pixels by down-sampling or up-sampling at least some of the first pixel information drawn to the first memory when the second pixel density of the second physical display has one or more predetermined relationships with one or more threshold pixel densities associated with the first memory.

* * * * *